United States Patent
Sugiyama (10) Patent No.: US 11,875,067 B2
(45) Date of Patent: Jan. 16, 2024

(54) INFORMATION PROCESSING APPARATUS, INFORMATION PROCESSING SYSTEM, INFORMATION PROCESSING METHOD, AND NON-TRANSITORY COMPUTER-EXECUTABLE MEDIUM

(71) Applicant: Takayuki Sugiyama, Kanagawa (JP)

(72) Inventor: Takayuki Sugiyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/982,505

(22) Filed: Nov. 7, 2022

(65) Prior Publication Data

US 2023/0168846 A1 Jun. 1, 2023

(51) Int. Cl.
*G06F 3/12* (2006.01)

(52) U.S. Cl.
CPC .......... *G06F 3/1208* (2013.01); *G06F 3/1257* (2013.01); *G06F 3/1287* (2013.01); *G06F 3/1204* (2013.01)

(58) Field of Classification Search
CPC .... G06F 3/1208; G06F 3/1257; G06F 3/1287; G06F 3/12; H04N 1/00015; H04N 1/00023; H04N 1/00034; H04N 1/00087; H04N 1/0009; H04N 1/6044; H04N 1/603
USPC ........................................................ 358/1.15
See application file for complete search history.

(56) References Cited

U.S. PATENT DOCUMENTS

| | | | |
|---|---|---|---|
| 2004/0179051 A1* | 9/2004 | Tainer | B41J 2/04595 347/11 |
| 2012/0120420 A1 | 5/2012 | Miyazaki | |
| 2017/0070647 A1 | 3/2017 | Takaishi et al. | |
| 2022/0141450 A1* | 5/2022 | Pieper | G05D 1/0223 348/148 |
| 2022/0174185 A1 | 6/2022 | Takamizawa et al. | |

FOREIGN PATENT DOCUMENTS

| | | |
|---|---|---|
| JP | H0787345 A | 3/1995 |
| JP | 2006-197410 | 7/2006 |
| JP | 2015-037224 | 2/2015 |

OTHER PUBLICATIONS

European Search Report; Application EP22206843; dated Jun. 27, 2023.

* cited by examiner

*Primary Examiner* — Darryl V Dottin
(74) *Attorney, Agent, or Firm* — Duft & Bornsen, PC (57) ABSTRACT

An information processing apparatus includes circuitry. The circuitry acquires a first state parameter indicative of a state of a printer engine of an image forming apparatus. The circuitry performs comparison between the first state parameter acquired and each of second state parameters registered in a memory in advance and indicative of states of the printer engine of the image forming apparatus at creation of a plurality of color profiles. The circuitry searches for a color profile corresponding to a second state parameter closest to the first state parameter from among the second state parameters.

9 Claims, 9 Drawing Sheets

INFORMATION PROCESSING APPARATUS, INFORMATION PROCESSING SYSTEM, INFORMATION PROCESSING METHOD, AND NON-TRANSITORY COMPUTER-EXECUTABLE MEDIUM

CROSS-REFERENCE TO RELATED APPLICATION

This patent application is based on and claims priority pursuant to 35 U.S.C. § 119(a) to Japanese Patent Application No. 2021-192481, filed on Nov. 26, 2021, in the Japan Patent Office, the entire disclosure of which is hereby incorporated by reference herein.

BACKGROUND

Technical Field

The present disclosure relates to an information processing apparatus, an information processing system, an information processing method, and a non-transitory computer-executable medium.

Related Art

In related art, an image forming apparatus has a technique called color profile conversion that calculates distribution of process colors appropriate for a medium to be printed, from color device values of document data to improve color reproducibility. Although high color reproducibility is ensured on various media by the color profile conversion, density characteristics of the respective process colors change due to a variation in the state of a printer engine caused by a factor, such as a change in environment (temperature, humidity, or the like), continuous printing, or elapse of time, and hence the image forming apparatus does not provide high color reproducibility merely by the color profile conversion. To address this, there is known a technique called a calibration process that measures the density or the like of each color actually printed on a medium and corrects the density to an appropriate density or the like to accommodate a change in density characteristic due to the above-described factor.

SUMMARY

An embodiment of the present disclosure includes an information processing apparatus including circuitry. The circuitry acquires a first state parameter indicative of a state of a printer engine of an image forming apparatus. The circuitry performs comparison between the first state parameter acquired and each of second state parameters registered in a memory in advance and indicative of states of the printer engine of the image forming apparatus at creation of a plurality of color profiles. The circuitry searches for a color profile corresponding to a second state parameter closest to the first state parameter from among the second state parameters.

An embodiment of the present disclosure includes an information processing method. The method includes acquiring a first state parameter indicative of a state of a printer engine of an image forming apparatus. The method includes comparing the acquired first state parameter with each of second state parameters registered in a memory in advance and indicative of states of the printer engine of the image forming apparatus at creation of a plurality of color profiles. The method includes searching for a color profile corresponding to a second state parameter closest to the first state parameter from among the second state parameters.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An information processing apparatus, an information processing system, an information processing method, and a non-transitory computer-executable medium according to embodiments of the present disclosure are described below with reference to the accompanying drawings. The present disclosure, however, is not limited to the following one or more embodiments, and components of the following one or more embodiments include components that may be easily conceived by those skilled in the art, those being substantially the same ones, and those being within equivalent ranges. Furthermore, various omissions, substitutions, changes, and combinations of the components can be made without departing from the gist of the following one or more embodiments.

General Arrangement of Information Processing System

Figure 1:
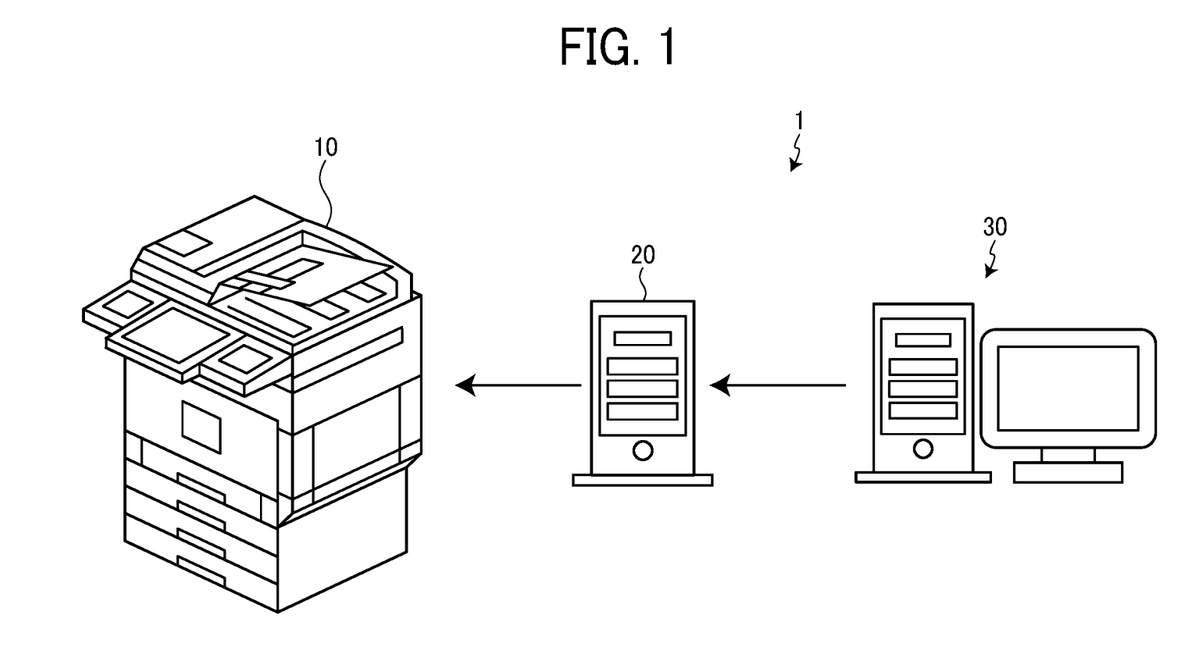
FIG. 1 is a diagram illustrating an example of a general arrangement of an information processing system according to an embodiment.

FIG. 1 is a diagram illustrating an example of a general arrangement of an information processing system 1 according to an embodiment. The general arrangement of the information processing system 1 according to the present embodiment will be described with reference to FIG. 1.

As illustrated in FIG. 1, the information processing system 1 includes an image forming apparatus 10, a digital front end (DFE) 20, and a management personal computer (PC) 30.

The image forming apparatus 10 is an apparatus that outputs a print based on a print image output from the DFE 20. For example, the image forming apparatus 10 may be a multifunction peripheral (MFP) or a commercial printer. Note that the MFP is a multifunction peripheral having at least two functions of a copying function, a printing function, a scanning function, and a facsimile function. In FIG. 1, the one image forming apparatus 10 is illustrated; however, it is not limited thereto, and the information processing system 1 may include a plurality of image forming apparatuses 10.

The DFE 20 is an information processing apparatus that executes image processing with color profile conversion using a color profile on image data received from the management PC 30 (or another external PC) to generate a print image printable by the image forming apparatus 10. The color profile mainly indicates an output profile (printer profile) corresponding to each image forming apparatus and to each medium type. The DFE 20 can perform data communication with the image forming apparatus 10 and the DFE 20 via a network such as a local area network (LAN).

The management PC 30 is an information processing apparatus that transmits a color profile for each image forming apparatus 10 and for each medium type for registration in the DFE 20, and that transmits image data for allowing the image forming apparatus 10 to output a print, to the DFE 20.

The information processing system 1 may include a colorimeter, such as a spectral colorimeter, that obtains the spectral reflectance of a print having a color chart printed thereon and that is to be used for a calibration process.

Hardware Configuration of Image Forming Apparatus

Figure 2:
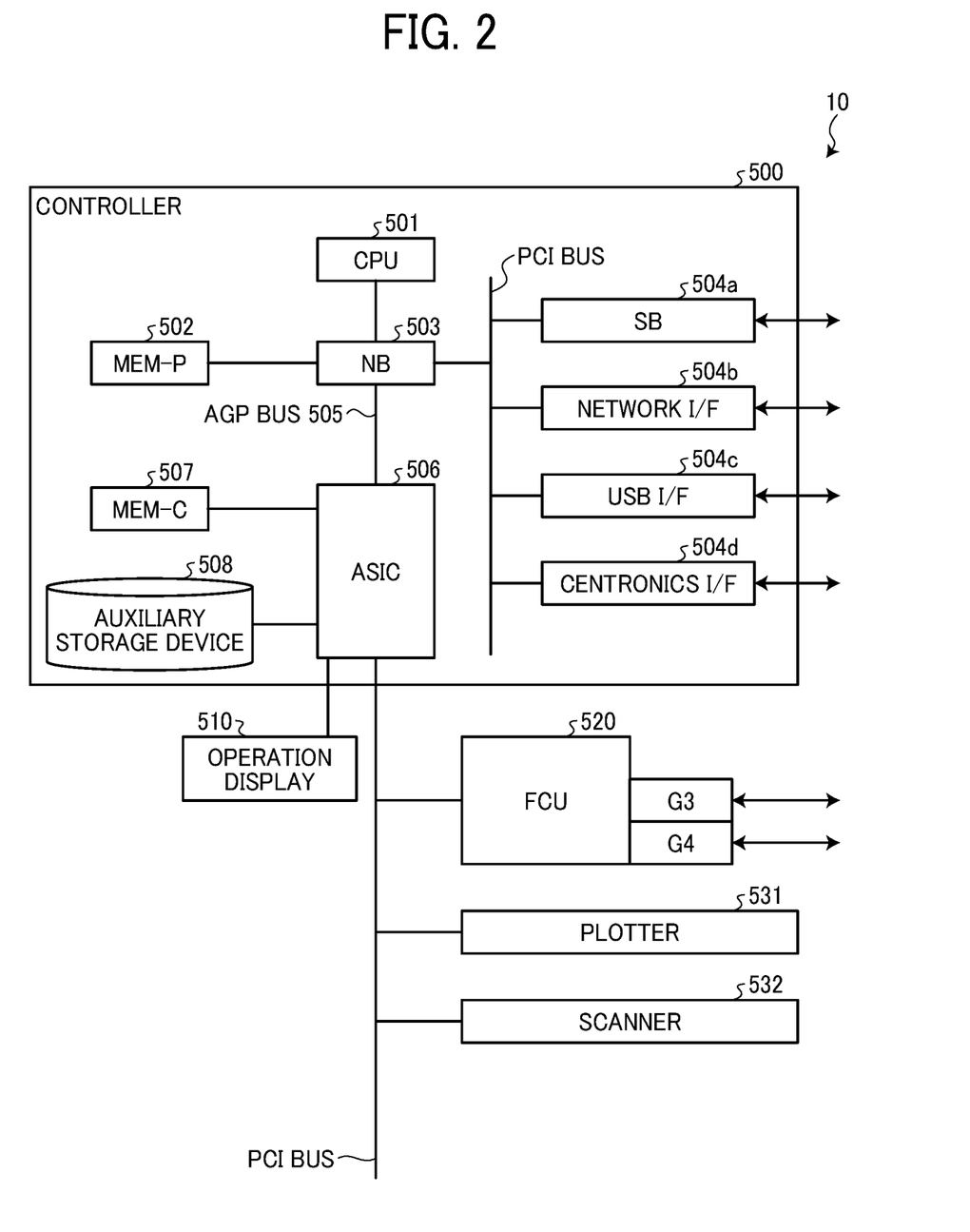
FIG. 2 is a block diagram illustrating an example of a hardware configuration of an image forming apparatus according to the embodiment.

FIG. 2 is a block diagram illustrating an example of a hardware configuration of the image forming apparatus 10 according to the present embodiment. The hardware configuration of the image forming apparatus 10 according to the present embodiment will be described with reference to FIG. 2.

As illustrated in FIG. 2, the image forming apparatus 10 according to the present embodiment includes a controller 500, an operation display 510, a facsimile control unit (FCU) 520, a plotter 531 (printer), and a scanner 532 that are coupled to one another via a peripheral component interface (PCI) bus.

The controller 500 is a device for overall control of the image forming apparatus 10, and the device also controls drawing and communication of the image forming apparatus 10, and input from the operation display 510.

The operation display 510 is, for example, a touch panel, is a device that receives input to the controller 500 (input function), and displays the state or the like of the image forming apparatus 10 (display function). The operation display 510 is directly coupled to an application specific integrated circuit (ASIC) 506 (described later).

The FCU 520 is a device that implements a facsimile function, and is coupled to the ASIC 506 via, for example, the PCI bus.

The plotter 531 is a device that implements a printing function, and is coupled to the ASIC 506 via, for example, the PCI bus. The scanner 532 is a device that implements a scanning function, and is coupled to the ASIC 506 via, for example, the PCI bus.

The controller 500 includes a central processing unit (CPU) 501, a system memory (MEM-P) 502, a northbridge (NB) 503, a southbridge (SB) 504a, a network interface (I/F) 504b, a Universal Serial Bus (USB) I/F 504c, a Centronics I/F 504d, the ASIC 506, a local memory (MEM-C) 507, and an auxiliary storage device 508.

The CPU 501 performs overall control of the image forming apparatus 10, and is coupled to a chip set including the MEM-P 502, the NB 503, and the SB 504a, and is coupled to other devices via the chip set.

The MEM-P 502 is a memory used as a memory for storing programs and data, a memory for loading programs and data, and a memory for storing drawing data of a printer. The MEM-P 502 includes a read-only memory (ROM) and a random-access memory (RAM). The ROM is a read-only memory for storing programs and data. The RAM is a writable and readable memory used as a memory for loading programs and data, and a memory for storing drawing data of the printer.

The NB 503 is a bridge for coupling the CPU 501 to the MEM-P 502, the SB 504a, and an Accelerated Graphics Port (AGP) bus 505. The NB 503 includes a memory controller that controls reading from and writing to the MEM-P 502, a peripheral component interconnect (PCI) master, and an AGP target.

The SB 504a is a bridge for coupling the NB 503 to PCI devices and peripheral devices. The SB 504a is coupled to the NB 503 via the PCI bus, and the network I/F 504b, the USB I/F 504c, and the Centronics I/F 504d are coupled to the PCI bus.

The network I/F 504b is an interface for data communication with an external device, such as the DFE 20, through the network. The network I/F 504b supports, for example, Ethernet® and can make communication conforming to, for example, transmission control protocol (TCP)/Internet protocol (IP).

The USB I/F 504c is an interface that can communicate with a device conforming to the USB standard.

The Centronics I/F 504d is an interface having a specification of a parallel port that can transmit a plurality of bits.

The AGP bus 505 is a bus interface for a graphics accelerator card suggested to accelerate graphics processing. The AGP bus 505 can speed up the graphics accelerator card by directly accessing the MEM-P 502 with high throughput.

The ASIC 506 is an integrated circuit (IC) for image processing applications having hardware elements for image processing. The ASIC 506 serves as a bridge for coupling the AGP bus 505, the PCI bus, the auxiliary storage device 508, and the MEM-C 507 to one another. The ASIC 506 includes a PCI target, an AGP master, an arbiter (ARB) as a core of the ASIC 506, a memory controller for controlling the MEM-C 507, a plurality of direct memory access controllers (DMACs) that rotate image data with a hardware logic or the like, and a PCI unit that transfers data between the plotter 531 and the scanner 532 via the PCI bus. For example, the FCU 520, the plotter 531, and the scanner 532 are coupled to the ASIC 506 via the PCI bus. The ASIC 506 is also connected to a host personal computer (PC) and a network.

The MEM-C 507 is used as a copy image buffer and a code buffer.

The auxiliary storage device 508 is a storage device such as a hard disk drive (HDD), a solid state drive (SSD), a Secure Digital (SD) card, or a flash memory, and is a storage for storing image data, programs, font data, and forms.

The programs of the above-described image forming apparatus 10 may be stored in any computer-readable recording medium (the auxiliary storage device 508 or the like) in a file format installable or executable by the computer, for distribution.

The hardware configuration of the image forming apparatus 10 illustrated in FIG. 2 is an example, and does not have to include all the component devices, and may include other component devices.

Hardware Configuration of DFE

Figure 3:
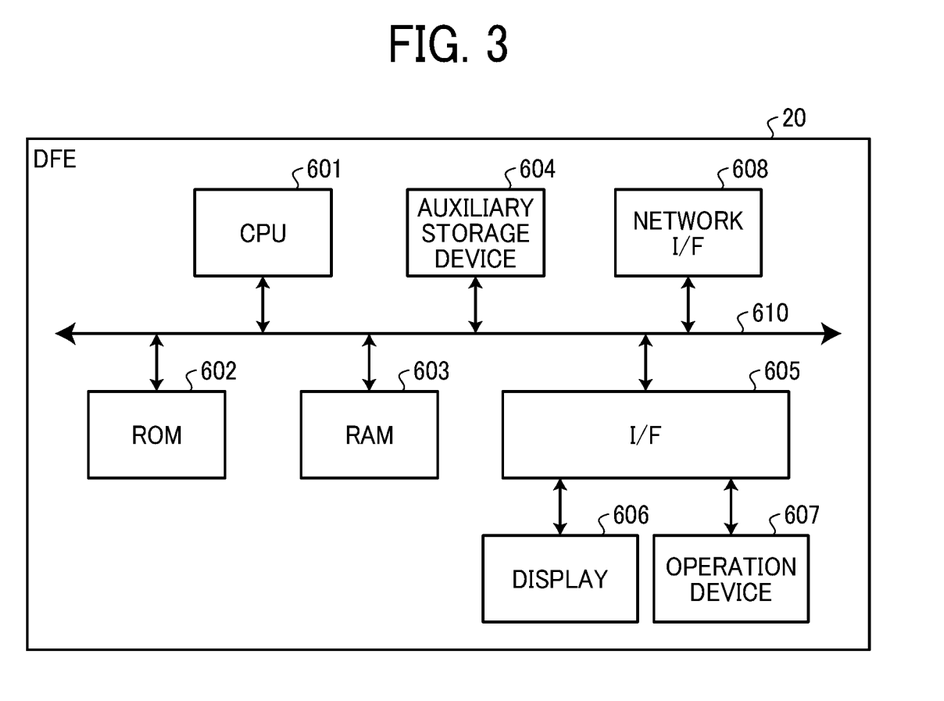
FIG. 3 is a block diagram illustrating an example of a hardware configuration of a digital front end (DFE) according to the embodiment.

FIG. 3 illustrates an example of a hardware configuration of the DFE 20 according to the embodiment. The hardware configuration of the DFE 20 according to the present embodiment will be described with reference to FIG. 3.

As illustrated in FIG. 3, the DFE 20 includes a CPU 601, a ROM 602, a RAM 603, an auxiliary storage device 604, an I/F 605, a display 606, an operation device 607, and a network I/F 608.

The CPU 601 is an arithmetic device that controls the overall operation of the DFE 20. The ROM 602 is a non-volatile storage device that stores a program for the DFE 20. The RAM 603 is a volatile storage device that is used as a work area of the DFE 20.

The auxiliary storage device 604 is a storage device, such as a hard disk drive (HDD) or a solid state drive (SSD), that stores color profile correspondence information, which is described later, and various data and programs.

The I/F 605 is an interface for performing data communication between an input/output device and a bus line 610.

The display 606 is a display device, such as a liquid crystal display or an organic electro-luminescence (EL) display that displays various information such as a cursor, a menu, a window, characters, or an image.

The operation device 607 is an input device that allows a user to select characters, numerals, or various instructions and to move a cursor.

The network I/F 608 is an interface for data communication with external apparatuses, such as the image forming apparatus 10 and the management PC 30, through the network. The network I/F 608 is, for example, a network interface card (NIC) that supports Ethernet® and that can make communication conforming to, for example, TCP/IP.

The above-described CPU 601, ROM 602, RAM 603, auxiliary storage device 604, I/F 605, and network I/F 608 are communicably coupled to one another via the bus line 610, such as an address bus or a data bus.

The hardware configuration of the DFE 20 illustrated in FIG. 3 is an example, and does not have to include all the components illustrated in FIG. 3 or may include other components. The hardware configuration of the management PC 30 also conforms to the hardware configuration illustrated in FIG. 3.

Configurations and Operations of Functional Blocks of DFE

Figure 4:
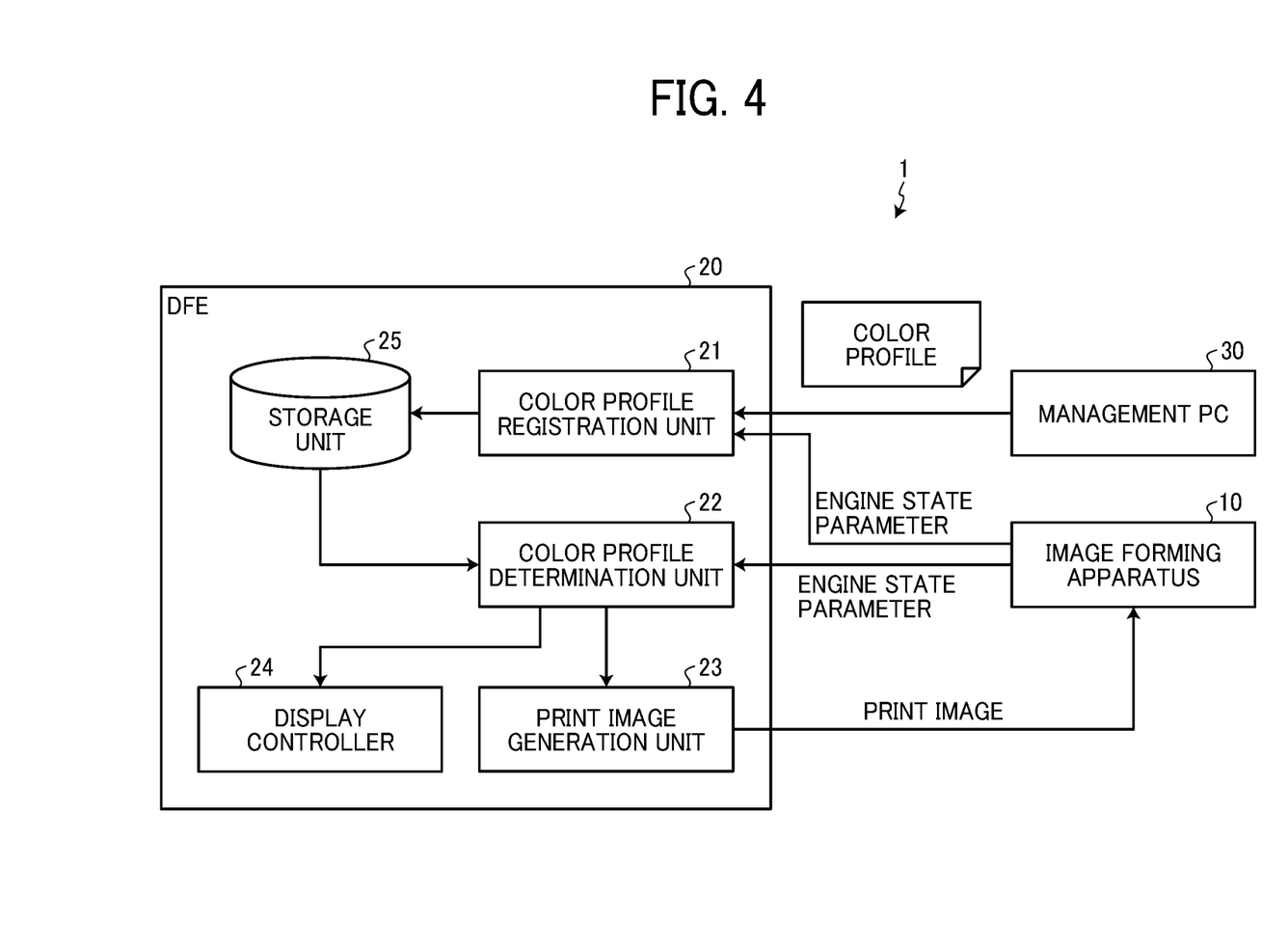
FIG. 4 is a block diagram illustrating an example of configurations of functional blocks of the DFE according to the embodiment.
Figure 5:
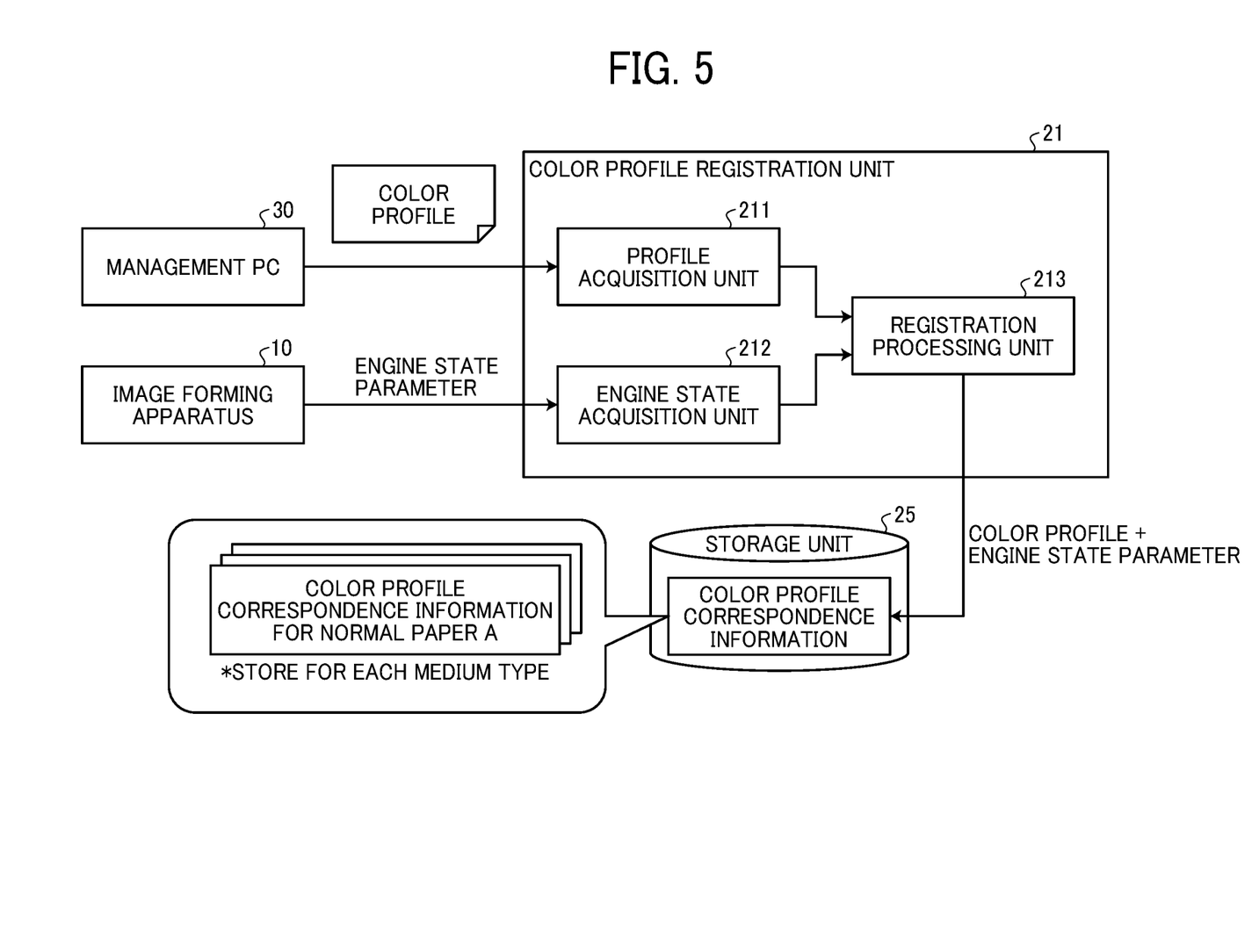
FIG. 5 is a block diagram illustrating an example of configurations of functional blocks of a color profile registration unit of the DFE according to the embodiment.
Figure 6:
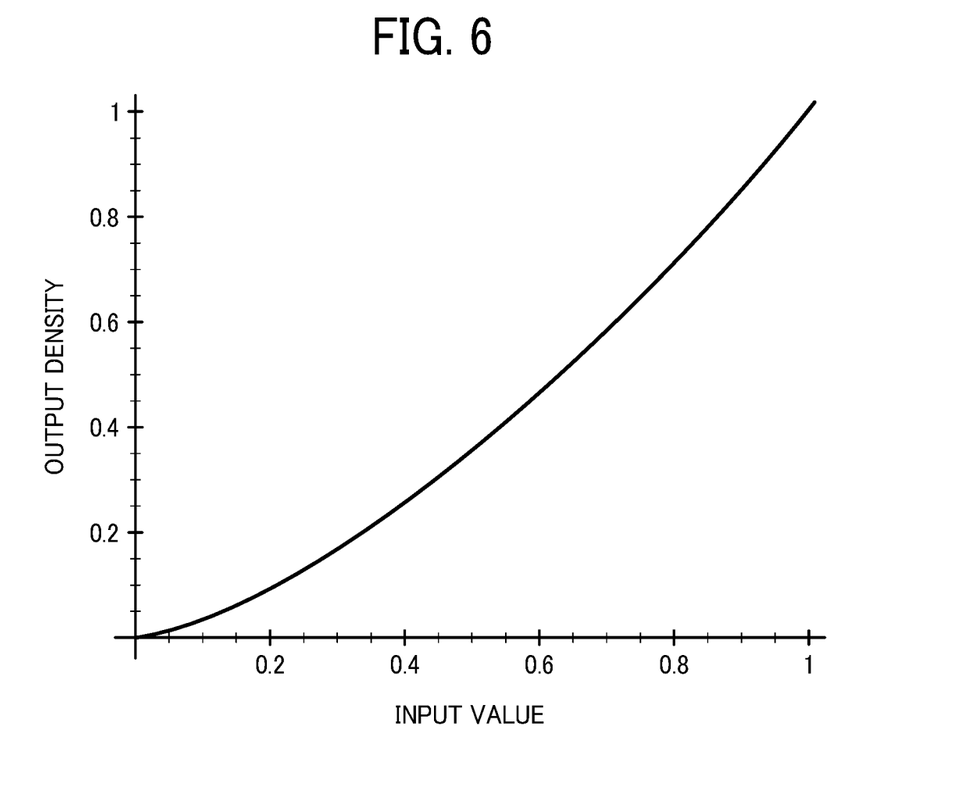
FIG. 6 is a graph presenting an example of density characteristics according to the embodiment.
Figure 7:
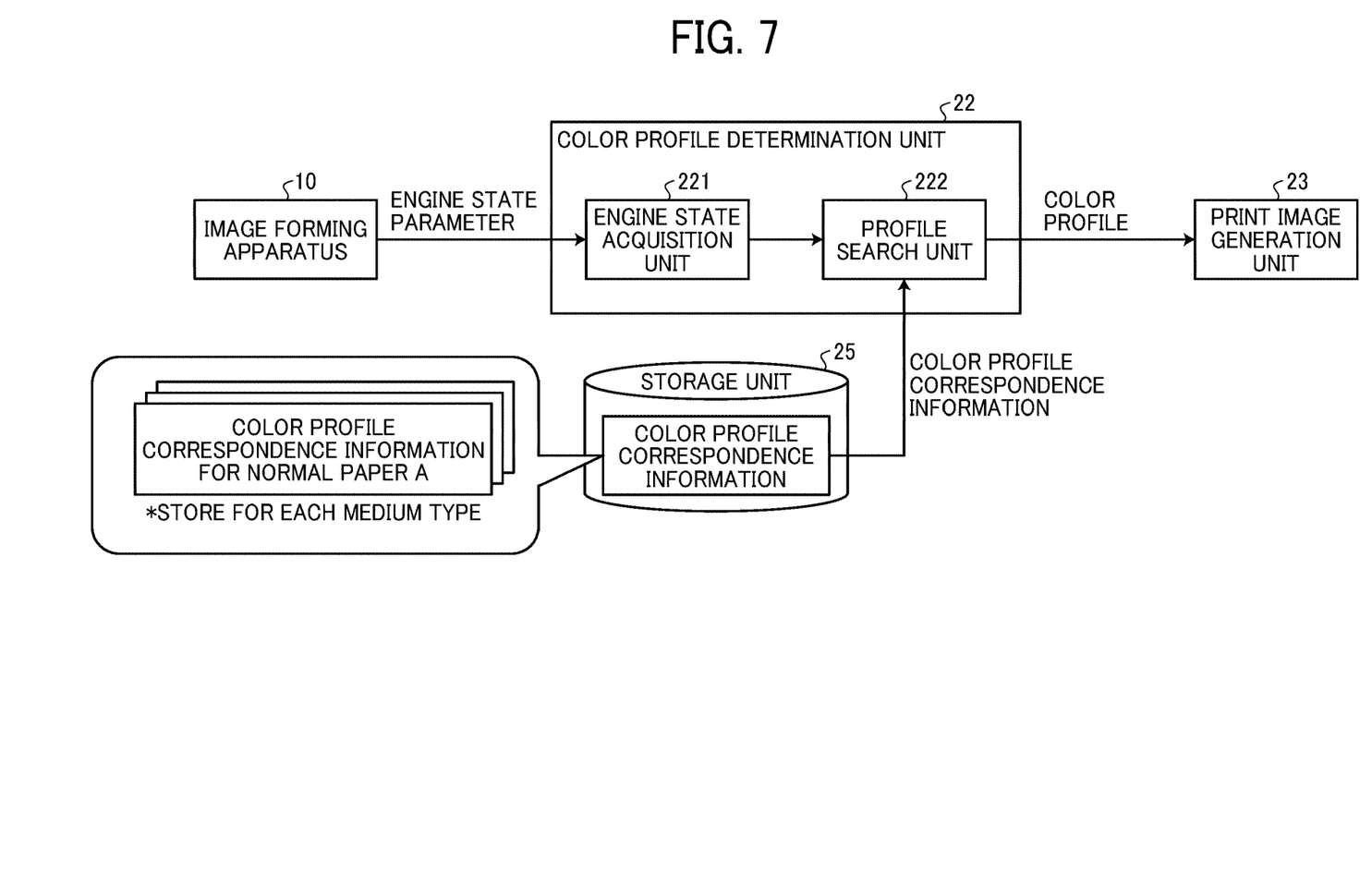
FIG. 7 is a block diagram illustrating an example of configurations of functional blocks of a color profile determination unit of the DFE according to the embodiment.

FIG. 4 is a block diagram illustrating an example of configurations of functional blocks of the DFE 20 according to the embodiment. FIG. 5 is a block diagram illustrating an example of configurations of functional blocks of a color profile registration unit 21 of the DFE 20 according to the embodiment. FIG. 6 is a graph presenting an example of density characteristics. FIG. 7 is a block diagram illustrating an example of configurations of functional blocks of a color profile determination unit 22 of the DFE 20 according to the embodiment. The configurations and operations of the functional blocks of the DFE 20 according to the present embodiment will be described with reference to FIGS. 4 to 7.

As illustrated in FIG. 4, the DFE 20 includes the color profile registration unit 21, the color profile determination unit 22, a print image generation unit 23, a display controller 24, and a storage unit 25.

The color profile registration unit 21 is a functional unit that receives a color profile corresponding to each image forming apparatus 10 and to each medium type received from the management PC 30, associates an engine state parameter indicative of a state of a printer engine received from the image forming apparatus 10 with the color profile, and registers (stores) the engine state parameter and the color profile in the storage unit 25. The color profile registration unit 21 is implemented by, for example, the CPU 601 illustrated in FIG. 3 executing a program. As illustrated in FIG. 5, the color profile registration unit 21 includes a profile acquisition unit 211 (second acquisition unit), an engine state acquisition unit 212 (third acquisition unit), and a registration processing unit 213 (registration unit).

The profile acquisition unit 211 is a functional unit that acquires a color profile from the management PC 30 via the network I/F 608. For example, the profile acquisition unit 211 acquires a color profile newly created through the calibration process. When acquiring the color profile, the profile acquisition unit 211 also acquires information on a medium type corresponding to the color profile together with the color profile to associate the color profile with the medium type. Then, the profile acquisition unit 211 transmits the acquired color profile and information on the medium type to the registration processing unit 213.

The engine state acquisition unit 212 is a functional unit that acquires an engine state parameter (second state parameter) indicative of a state of the printer engine of the image forming apparatus 10 at a time at which the profile acquisition unit 211 has acquired the color profile, via the network I/F 608. That is, the engine state acquisition unit 212 acquires the engine state parameter from the image forming apparatus 10 at a timing at which the profile acquisition unit 211 has acquired the color profile, via the network I/F 608. Then, the engine state acquisition unit 212 transmits the acquired engine state parameter to the registration processing unit 213. That is, the engine state parameter acquired by the engine state acquisition unit 212 indicates a state of the printer engine as a result of applying the color profile acquired by the profile acquisition unit 211.

The engine state parameter indicates a printing characteristic of each color recognized by the printer engine using an internal sensor or the like, although various parameters may be expected depending on the image forming apparatus 10. For example, regarding "density with respect to input" read by the internal sensor as a parameter indicative of a state of the printer engine, the relationship between the input and the density can be approximated to a gamma value expressed by a one-dimensional numeral based on Expression (1) below, and hence a state (characteristic) of a printer engine of a single color can be expressed by a single numeral.

$$Y = X^A \quad (1)$$

In Expression (1), Y is an output density normalized to 0 to 1, X is an input value such as a color device value normalized to 0 to 1, and A is a gamma value serving as an engine state parameter. In the present embodiment, it is assumed that the gamma value A (an example of a value based on density) is handled as an engine state parameter. FIG. 6 is a graph illustrating the relationship between the input value X and the output density Y when the gamma value A=1.5. When the relationship between the input value X and the output density Y is expressed by a curve of such a graph, the engine state parameter is 1.5. That is, the image forming apparatus 10, for example, may periodically perform color measurement on a print using an internal sensor or the like (an example of a reading device), obtain a gamma value from the relationship between the density (colorimetric value) obtained by the color measurement and the input such as a color device value, and store the gamma value in the auxiliary storage device 508 in association with the medium type of the print and the used profile.

As illustrated in FIG. 5, the registration processing unit 213 is a functional unit that associates the color profile and the information on the medium type acquired by the profile acquisition unit 211 with the engine state parameter acquired by the engine state acquisition unit 212 and registers (stores) the color profile, the information on the medium type, and the engine state parameter in the storage unit 25 as color profile correspondence information (correspondence information). Table 1 below presents color profile correspondence information in which a profile is associated with an engine state parameter of each color. The color profile correspondence information is registered in the storage unit 25 in association with each image forming apparatus 10 and with each medium type.

TABLE 1

Color Profile Correspondence Information

| Profile | Engine state parameter | | | |
|---|---|---|---|---|
| | C | M | Y | K |
| Profile 1 | 1.0 | 1.0 | 1.0 | 1.0 |
| Profile 2 | 1.3 | 0.8 | 1.0 | 1.5 |
| Profile 3 | 1.5 | 1.6 | 1.2 | 2.0 |
| ... | ... | ... | ... | ... |
| Profile 10 | 1.0 | 1.4 | 1.7 | 2.2 |

The color profile determination unit 22 is a functional unit that determines a color profile optimal for a current image forming apparatus 10 from color profiles stored in the storage unit 25 based on an engine state parameter indicative of a current state of the printer engine received from the image forming apparatus 10. In a case where an optimum color profile is present, the color profile determination unit 22 transmits the color profile to the print image generation unit 23 to be used in the color profile conversion when the print image generation unit 23 generates a print image. In contrast, in a case where an optimal color profile is not present, the color profile determination unit 22 performs a process of prompting the user to newly create a color profile in the current state of the printer engine and register the color profile. The color profile determination unit 22 is implemented by, for example, the CPU 601 illustrated in FIG. 3 executing a program. As illustrated in FIG. 7, the color profile determination unit 22 includes an engine state acquisition unit 221 (first acquisition unit) and a profile search unit 222 (search unit).

The engine state acquisition unit 221 is a functional unit that acquires an engine state parameter (first state parameter) indicative of a state of the printer engine of the image forming apparatus 10 at a current time (that is, at the acquisition) via the network I/F 608. Then, the engine state acquisition unit 221 transmits the acquired engine state parameter to the profile search unit 222.

The profile search unit 222 is a functional unit that compares the current engine state parameter acquired by the engine state acquisition unit 221 with each engine state parameter of the color profile correspondence information corresponding to the image forming apparatus and the medium type corresponding to the engine state parameter stored in the storage unit 25, and searches for an optimal color profile having a numerical value closest to the numerical value of the current engine state parameter. Specifically, the profile search unit 222 adds up the absolute values of the differences of the respective colors between the current engine state parameter and the engine state parameter of the color profile correspondence information on the image forming apparatus 10 and the medium type corresponding to the engine state parameter to calculate a search value. The search value is an example of a difference between the current engine state parameter and the engine state parameter of the color profile correspondence information on the image forming apparatus 10 and the medium type corresponding to the engine state parameter. Alternatively, for example, a value obtained by directly adding up the differences of the respective colors or an average value of the absolute values of the differences of the respective colors may be used as the difference between the parameters. The profile search unit 222 calculates a search value for all color profiles included in the color profile correspondence information. Table 2 below presents a calculation result of a search value corresponding to each color profile in the color profile correspondence information presented in Table 1 when the current engine state parameter includes C=1.2, M=1.1, Y=1.0, and K=1.5.

TABLE 2

Color Profile Correspondence Information and Search Value

| Profile | Engine state parameter | | | | Search value |
|---|---|---|---|---|---|
| | C | M | Y | K | |
| Profile 1 | 1.0 | 1.0 | 1.0 | 1.0 | 0.8 |
| Profile 2 | 1.3 | 0.8 | 1.0 | 1.5 | 0.4 |
| Profile 3 | 1.5 | 1.6 | 1.2 | 2.0 | 1.5 |
| ... | ... | ... | ... | ... | ... |
| Profile 10 | 1.0 | 1.4 | 1.7 | 2.2 | 1.9 |

In the case of Table 2, since the search value of the "profile 2" is the smallest, the profile search unit 222 determines that the "profile 2" is a color profile registered at the timing in the state closest to the current state of the printer engine of the image forming apparatus 10. However, for example, when the number of registered color profiles is small or when the current state of the printer engine is markedly different from the previous state, although the color profile having the smallest search value is used, the hue may markedly vary and the print quality may be unsatisfactory. Thus, a threshold value serving as a reference for determining whether to employ the searched color profile is provided, the search value of the color profile determined to have the smallest search value is compared with the threshold value, and validity of the color profile is determined.

When the search value is the threshold value or smaller, it is determined that the state of the printer engine of the image forming apparatus 10 at registration of the color profile is very close to the current state of the printer engine of the image forming apparatus 10. Thus, even when the color profile selected by the profile search unit 222 as the one having the smallest search value is applied to the current image forming apparatus 10, the influence of a variation in color is small, and hence the color profile is transmitted to the print image generation unit 23 to be set as a color profile used for the color profile conversion at generation of a print image and to be used in actual printing.

In contrast, when the search value is larger than the threshold value, it is determined that all the color profiles corresponding to the image forming apparatus 10 and the medium type registered in the storage unit 25 are not appropriate for application to the current image forming apparatus 10. Thus, the profile search unit 222 performs a process of prompting the user to newly create a color profile in the current state of the printer engine of the image forming apparatus 10 and register the color profile. Specifically, the profile search unit 222 transmits information indicative of prompting the user to newly create a color profile in the current state of the printer engine of the image forming apparatus 10 and register the color profile, to the display controller 24.

The print image generation unit 23 is a functional unit that performs image processing involving the color profile conversion using the color profile searched by the profile search unit 222 on image data received from the management PC 30 (or another external PC) to generate a print image printable by the image forming apparatus 10. The print image generation unit 23 transmits the generated print image to the image forming apparatus 10 via the network I/F 608. The print image generation unit 23 is implemented by, for example, the CPU 601 illustrated in FIG. 3 executing a program.

The display controller 24 is a functional unit that controls a display operation of the display 606. For example, when the display controller 24 receives the information indicative of prompting the user to newly create the color profile in the current state of the printer engine of the image forming apparatus 10 and register the color profile, from the profile search unit 222, the display controller 24 controls the display 606 to display the information. The display controller 24 is implemented by the CPU 601 illustrated in FIG. 3 executing a program. The control of the display controller 24 is not limited to controlling the display 606 of the DFE 20 to display the information, and the display controller 24 may transmit the information to the management PC 30 and cause the management PC 30 to display the information.

The storage unit 25 is a functional unit that stores the color profile correspondence information registered by the registration processing unit 213, and various types of data and programs. The storage unit 25 is implemented by the auxiliary storage device 604 or the RAM 603 illustrated in FIG. 3.

At least part of functional units that are implemented by executing software (program) among the functional units of the DFE 20 illustrated in FIG. 4 may be implemented by a hardware circuit such as a field-programmable gate array (FPGA) or an ASIC.

Each functional unit of the DFE 20 illustrated in FIG. 4 conceptually indicates a function, and is not limited to such a configuration. For example, a plurality of functional units illustrated as independent functional units in the DFE 20 illustrated in FIG. 4 may be provided as one functional unit. In contrast, a function of one functional unit in the DFE 20 illustrated in FIG. 4 may be divided into a plurality of functions to provide a plurality of functional units. The same applies to the functional units of the color profile registration unit 21 illustrated in FIG. 5 and the functional units of the color profile determination unit 22 illustrated in FIG. 7.

Flow of Color Profile Registration Process

Figure 8:
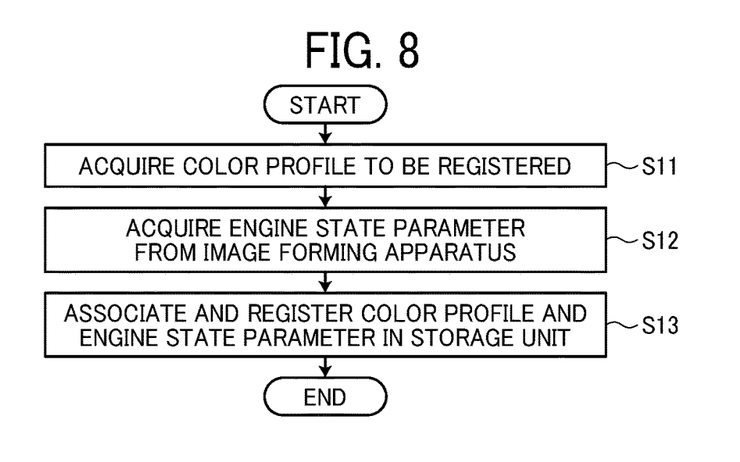
FIG. 8 is a flowchart presenting an example of a flow of a color profile registration process of the DFE according to the embodiment.

FIG. 8 is a flowchart presenting an example of a flow of a color profile registration process of the DFE 20 according to the embodiment. The flow of the color profile registration process of the DFE 20 according to the present embodiment will be described with reference to FIG. 8.

Step S11

The profile acquisition unit 211 of the color profile registration unit 21 acquires a color profile from the management PC 30 via the network I/F 608. When acquiring the color profile, the profile acquisition unit 211 also acquires information on a medium type corresponding to the color profile together with the color profile to associate the color profile with the medium type. Then, the profile acquisition unit 211 transmits the acquired color profile and information on the medium type to the registration processing unit 213. Then, the process proceeds to step S12.

Step S12

The engine state acquisition unit 212 of the color profile registration unit 21 is a functional unit that acquires an engine state parameter indicative of a state of the printer engine of the image forming apparatus 10 at a time at which the profile acquisition unit 211 has acquired the color profile, via the network I/F 608. That is, the engine state acquisition unit 212 acquires the engine state parameter from the image forming apparatus 10 at a timing at which the profile acquisition unit 211 has acquired the color profile, via the network I/F 608. Then, the engine state acquisition unit 212 transmits the acquired engine state parameter to the registration processing unit 213. Then, the process proceeds to step S13.

Step S13

The registration processing unit 213 of the color profile registration unit 21 associates the color profile and the information on the medium type acquired by the profile acquisition unit 211 with the engine state parameter acquired by the engine state acquisition unit 212 and registers (stores), as color profile correspondence information, the color profile, the information on the medium type, and the engine state parameter in the storage unit 25. Then, the color profile registration process is ended.

Through the above-described flow from step S11 to step S13, the color profile registration process of the DFE 20 is executed.

Flow of Color Profile Determination Process

Figure 9:
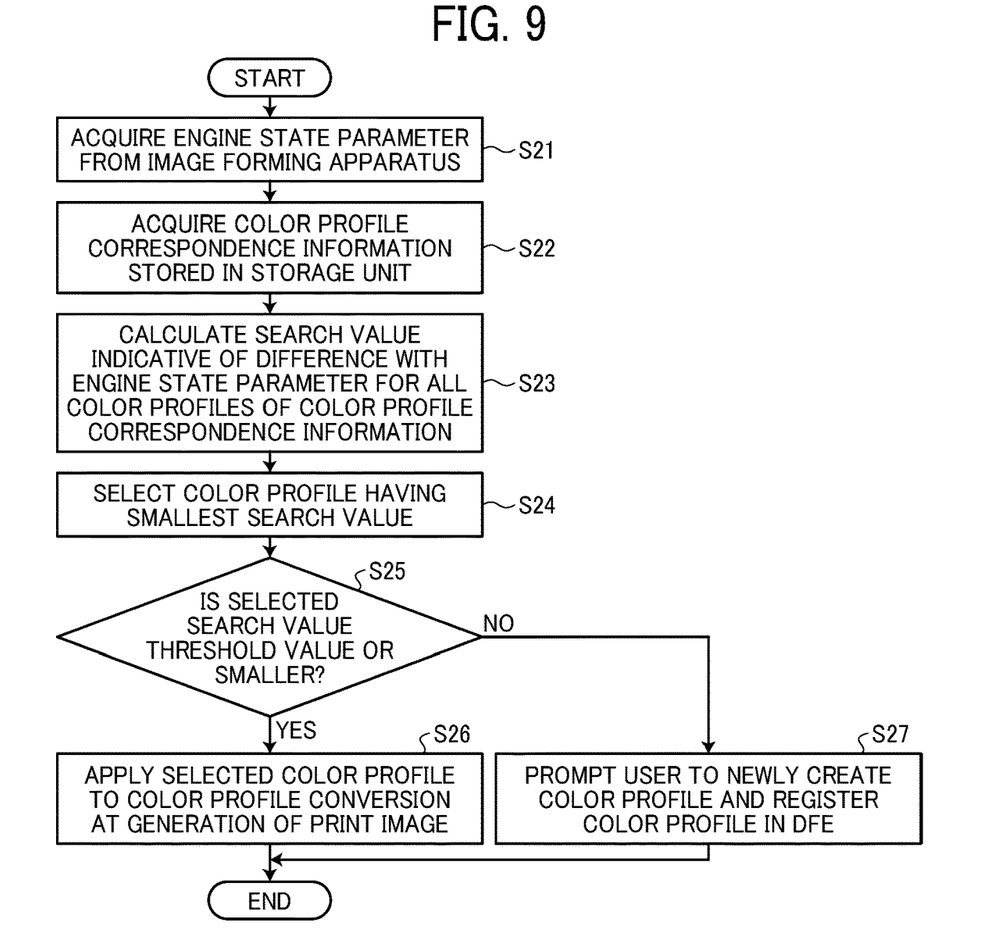
FIG. 9 is a flowchart presenting an example of a flow of a color profile determination process of the DFE according to the embodiment.

FIG. 9 is a flowchart presenting an example of a flow of a color profile determination process of the DFE 20 according to the embodiment. The flow of the color profile determination process of the DFE 20 according to the present embodiment will be described with reference to FIG. 9.

Step S21

The engine state acquisition unit 221 of the color profile determination unit 22 acquires an engine state parameter indicative of a state of the printer engine of the image forming apparatus 10 at a current time (that is, at the acquisition) via the network I/F 608. Then, the engine state acquisition unit 221 transmits the acquired engine state parameter to the profile search unit 222. Then, the process proceeds to step S22.

Step S22

The profile search unit 222 of the color profile determination unit 22 acquires color profile correspondence information corresponding to the image forming apparatus 10 and the medium type corresponding to the current engine state parameter acquired by the engine state acquisition unit 221, from the storage unit 25. Then, the process proceeds to step S23.

Step S23

The profile search unit 222 adds up the absolute values of the differences of the respective colors between the current engine state parameter and the engine state parameter of the color profile correspondence information on the image forming apparatus 10 and the medium type corresponding to the engine state parameter to calculate a search value. The profile search unit 222 calculates a search value for all color profiles included in the color profile correspondence information. Then, the process proceeds to step S24.

Step S24

The profile search unit 222 selects a color profile having the smallest search value among the calculated search values. Then, the process proceeds to step S25.

Step S25

The profile search unit 222 determines whether the search value of the selected color profile is a predetermined threshold value or smaller. The predetermined threshold value may be set by, for example, a user, or a designer. When the search value is the threshold value or smaller (step S25: Yes), the process proceeds to step S26. When the search value is larger than the threshold value (step S25: No), the process proceeds to step S27.

Step S26

Thus, the profile search unit 222 determines the selected color profile as to be applied to the current image forming apparatus 10, transmits the color profile to the print image generation unit 23, so as to be set as a color profile used for the color profile conversion at generation of a print image and to be used in actual printing. Then, the color profile determination process is ended.

Step S27

The profile search unit 222 performs a process of prompting the user to newly create a color profile in the current state of the printer engine of the image forming apparatus 10 and register the color profile in the DFE 20. Specifically, the profile search unit 222 transmits information indicative of prompting the user to newly create a color profile in the current state of the printer engine of the image forming apparatus 10 and register the color profile, to the display controller 24. When the display controller 24 receives the information indicative of prompting the user to newly create the color profile in the current state of the printer engine of the image forming apparatus 10 and register the color profile, from the profile search unit 222, the display controller 24 controls the display 606 to display the information.

Then, the color profile determination process is ended.

Through the above-described flow from step S21 to step S27, the color profile determination process of the DFE 20 is executed.

As described above, in the DFE 20 according to the present embodiment, the engine state acquisition unit 221 acquires an engine state parameter (first state parameter) indicative of a current state of the printer engine of the image forming apparatus 10, and the profile search unit 222 compares the engine state parameter acquired by the engine state acquisition unit 221 with each of engine state parameters (second state parameters) registered in the storage unit 25 in advance and indicative of states of the printer engine of the image forming apparatus 10 at creation of a plurality of color profiles, and searches for a color profile corresponding to an engine state parameter closest to the engine state parameter indicative of the current printer state from among the engine state parameters. Accordingly, it is possible to determine whether to automatically and appropriately change a profile in response to a change in density characteristic of a color other than a single color of a process color.

In the DFE 20, when a color profile is newly created, the profile acquisition unit 211 acquires the color profile and information on a medium type corresponding to the color profile, the engine state acquisition unit 212 acquires an engine state parameter (second state parameter) indicative of a state of the printer engine of the image forming apparatus 10 at a time at which the profile acquisition unit 211 has acquired the color profile, the registration processing unit 213 registers color profile correspondence information in which the color profile and the information on the medium type acquired by the profile acquisition unit 211 are associated with the engine state parameter acquired by the engine state acquisition unit 212 in the storage unit 25, and the profile search unit 222 compares the engine state parameter acquired by the engine state acquisition unit 221 with each of engine state parameters indicated by the color profile correspondence information corresponding to the medium type corresponding to the engine state parameter. Accordingly, the color profile correspondence information can be managed for each medium type, and it is possible to determine whether to automatically and appropriately change a profile in response to a change in density characteristic for each medium type.

Modification

Figure 10:
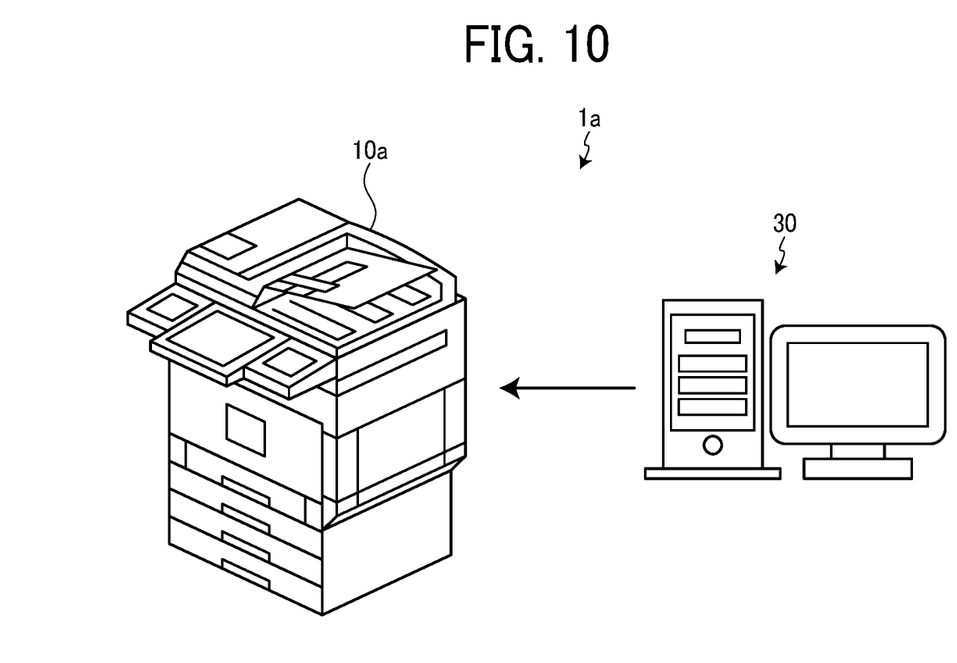
FIG. 10 is a diagram illustrating an example of a general arrangement of an information processing system according to a modification.

FIG. 10 is a diagram illustrating an example of a general arrangement of an information processing system 1a according to a modification. The information processing system 1a according to the modification will be described with reference to FIG. 10.

In the information processing system 1 according to the above-described embodiment, the DFE 20 has the registration function and the determination function (search function) of a color profile. In the modification, as illustrated in FIG. 10, the information processing system 1a includes an image forming apparatus 10a (an example of an information processing apparatus) and a management PC 30. The image forming apparatus 10a has, in addition to an expected image forming function, the functions of the DFE 20 according to the above-described embodiment (the functions of the color profile registration unit 21, the color profile determination unit 22, the print image generation unit 23, the display controller 24, and the storage unit 25). Then, the image forming apparatus 10a executes processes such as the above-described image processing that has been executed by the DFE 20, on image data received from the management PC 30 (or another external PC).

Even with the above-described configuration, advantageous effects similar to those of the DFE 20 according to the above-described embodiment are attained.

Although the density characteristic of a single color of each of the process colors are appropriately corrected by the known calibration process, for example, when the density characteristics of the printer markedly change, the density characteristic of a mixed color of the printer changes due to the correction by the calibration process, and hence the color reproducibility using the color profile decreases. In this case, it is recommended to use an optimized profile in the current state of the printer engine; however, there is a disadvantage that it is not determined whether the density characteristic of the mixed color is appropriate after the calibration process unless printing is actually performed and a user directly checks the print.

This is because the amount of the actual color material to be printed on the medium markedly changes as the density before the correction and the target density are farther from each other due to the correction by the calibration process. This change does not affect a single color; however, when two or more colors are superposed, the way of superposition of the colors changes, and the density characteristic of the mixed color changes. Thus, the calibration process of measuring the single color printed on the medium and correcting the single color cannot respond to a change in density characteristic of the mixed color due to a variation in the state of the printer engine.

As a technique relating to such a calibration process, to enable a calibration process for a special color material, a technique is known according to which a chart including six patches for each of colors obtained by equally dividing a hue ring into six parts (36 patches in total) is output, and a user selects a patch of a color visually closest to a target color sample for each divided hue to adjust a color profile.

However, with the above-described technique, there is a disadvantage that it is not possible to determine whether to change the profile in response to a change in the density characteristic of a color other than a single color of a process color unless printing is actually performed using the profile and the user directly checks the print.

According to an aspect of the present disclosure, an information processing apparatus, an information processing system, an information processing method, and a computer-executable storage medium are provided that can determine whether to automatically and appropriately change a profile in response to a change in density characteristic of a color other than a single color of a process color.

Each of the functions of the above-described embodiment and modification can be implemented by one or more processing circuits or circuitry. Examples of the "processing circuits or circuitry" include a programmed processor, as a processor that is mounted on an electronic circuit and that performs the functions through software. Examples of the "processing circuits or circuitry" also include devices such as an ASIC, a digital signal processor (DSP), a FPGA, and circuit components of related art designed to execute the recited functions.

The program to be executed by the DFE 20 and the image forming apparatus 10*a* according to the above-described embodiment and modification may be provided by being incorporated in advance in a ROM or the like.

The program to be executed by the DFE 20 and the image forming apparatus 10*a* according to the above-described embodiment and modification may be provided by being recorded in a computer-readable storage medium such as a compact disc read-only memory (CD-ROM), a flexible disk (FD), a compact disk-recordable (CD-R), or a digital versatile disk (DVD) in a file of an installable format or an executable format to be provided as a computer program product.

The program to be executed by the DFE 20 and the image forming apparatus 10*a* according to the above-described embodiment and modification may be stored in a computer connected to a network such as the Internet and may be provided by being downloaded via the network. Furthermore, the program executed by the DFE 20 and the image forming apparatus 10*a* according to the above-described embodiment and modification may be provided or distributed via a network such as the Internet.

The program to be executed by the DFE 20 and the image forming apparatus 10*a* according to the above-described embodiment and modification has a module configuration including the above-described functional units, and as actual hardware, a CPU (processor) reads the program from a ROM and executes the program to load the above-described functional units onto a main storage device and generate the functional units on the main storage device.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus, comprising circuitry configured to:
   acquire a first state parameter indicative of a state of a printer engine of an image forming apparatus;
   perform comparison between the first state parameter acquired and each of second state parameters registered in a memory in advance and indicative of states of the printer engine of the image forming apparatus at creation of a plurality of color profiles;
   responsive to the comparison between the first state parameter and each of the second state parameters, calculate differences between the first state parameter and the second state parameters;
   search for a color profile corresponding to a second state parameter closest to the first state parameter from among the second state parameters; and
   when a smallest difference among the calculated differences is a predetermined threshold value or smaller, apply a color profile corresponding to the second state parameter corresponding to the smallest difference to be used for color profile conversion at generation of a print image.

2. The information processing apparatus according to claim 1, wherein the circuitry is further configured to:
   acquire, in response to new creation of a color profile, the color profile and information on a medium type corresponding to the color profile;

acquire the second state parameter indicative of a state of the printer engine of the image forming apparatus at a time at which the circuitry has acquired the color profile; and register correspondence information in which the color profile and the information on the medium type acquired is associated with the second state parameter acquired, in the memory.

3. The information processing apparatus according to claim 2, wherein the circuitry is further configured to:

perform comparison between the first state parameter and each of the second state parameters indicated by the correspondence information corresponding to a medium type corresponding to the first state parameter.

4. The information processing apparatus according to claim 1, wherein, when the smallest difference is larger than the predetermined threshold value, the circuitry is further configured to execute a process of prompting new creation of a color profile in a current state of the printer engine of the image forming apparatus and registration of the color profile.

5. The information processing apparatus according to claim 1, wherein the first state parameter and the second state parameters are values based on a density of a print read by a reading device in the image forming apparatus.

6. The information processing apparatus according to claim 1, wherein the information processing apparatus is the image forming apparatus.

7. An information processing system, comprising:
the image forming apparatus; and
the information processing apparatus according to claim 1.

8. An information processing method, comprising:
acquiring a first state parameter indicative of a state of a printer engine of an image forming apparatus;
comparing the acquired first state parameter with each of second state parameters registered in a memory in advance and indicative of states of the printer engine of the image forming apparatus at creation of a plurality of color profiles;
responsive to comparing the acquired first state parameter and each of the second state parameters, calculate differences between the acquired first state parameter and the second state parameters;
searching for a color profile corresponding to a second state parameter closest to the first state parameter from among the second state parameters; and
when a smallest difference among the calculated differences is a predetermined threshold value or smaller, applying a color profile corresponding to the second state parameter corresponding to the smallest difference to be used for color profile conversion at generation of a print image.

9. A non-transitory computer-executable medium storing a program storing instructions which, when executed by one or more processors of a computer, causes the computer to perform the information processing method of claim 8.

* * * * *